US008604925B2

(12) United States Patent
Monte et al.

(10) Patent No.: US 8,604,925 B2
(45) Date of Patent: *Dec. 10, 2013

(54) SIMPLEX PERSONAL AND ASSET TRACKER

(75) Inventors: Paul A. Monte, San Jose, CA (US);
Michael Santiago, Pleasanton, CA (US);
Robert D. Miller, Milpitas, CA (US);
David Homer Biggs, Gardnerville, NV (US); Mark Edward Sutton, Covington, LA (US); Walter Debus, Covington, LA (US); Robert Rouquette, Covington, LA (US); Ronnie Daryl Tanner, Covington, LA (US)

(73) Assignee: Globalstar, Inc., Covington, LA (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/910,322

(22) Filed: Oct. 22, 2010

(65) Prior Publication Data
US 2011/0140884 A1 Jun. 16, 2011

Related U.S. Application Data

(63) Continuation-in-part of application No. 12/657,470, filed on Jan. 20, 2010, now Pat. No. 8,130,096.

(60) Provisional application No. 61/254,502, filed on Oct. 23, 2009.

(51) Int. Cl.
*G08B 1/08* (2006.01)

(52) U.S. Cl.
USPC .............. 340/539.13; 340/539.11; 340/426.1; 340/988

(58) Field of Classification Search
USPC ......... 340/539.13, 988, 539.11, 426.1, 573.1, 340/573.4, 539.1, 539.16, 539.18, 426.13, 340/426.19, 429, 989, 991, 993; 455/404.1, 455/456.1, 457, 466, 41.2
See application file for complete search history.

(56) References Cited

U.S. PATENT DOCUMENTS

| 5,504,493 | A | 4/1996 | Hirshfield |
| 5,552,798 | A | 9/1996 | Dietrich et al. |
| 5,581,268 | A | 12/1996 | Hirshfield |
| 5,592,481 | A | 1/1997 | Wiedeman et al. |

(Continued)

OTHER PUBLICATIONS

Patent Cooperation Treaty—Written Opinion of the International Searching Authority for International Application No. PCT/US10/53689, Dec. 27, 2010, pp. 1-9, USA.

(Continued)

*Primary Examiner* — Anh V La
(74) *Attorney, Agent, or Firm* — Jones Walker LLP

(57) ABSTRACT

An asset locator device including (a) a wireless receiver capable of receiving an identifier signal transmitted from a short range wireless transmitter device; (b) a wireless transmitter capable of transmitting a message to a space based network; (c) a positioning system capable of determining the location of the locator device; (d) a vibration sensor; and (e) a controller. The controller instructs the asset locator to: (i) attempt to detect the identifier signal from the transmitter device if the vibration sensor senses vibration; and (ii) transmit a signal, including an asset location, to the space based network if: (1) the identifier signal is not detected; and (2) location fixes from the positioning system indicate a location change of the asset.

20 Claims, 11 Drawing Sheets

(56) References Cited

U.S. PATENT DOCUMENTS

| | | |
|---|---|---|
| 5,619,525 A | 4/1997 | Wiedeman et al. |
| 5,634,190 A | 5/1997 | Wiedeman |
| 5,640,386 A | 6/1997 | Wiedeman |
| 5,664,006 A | 9/1997 | Monte et al. |
| 5,697,050 A | 12/1997 | Wiedeman |
| 5,758,260 A | 5/1998 | Wiedeman |
| 5,758,261 A | 5/1998 | Wiedeman |
| 5,791,598 A | 8/1998 | Rodden et al. |
| 5,796,760 A | 8/1998 | Wiedeman et al. |
| 5,802,445 A | 9/1998 | Wiedeman et al. |
| 5,812,538 A | 9/1998 | Wiedeman et al. |
| 5,812,932 A | 9/1998 | Wiedeman et al. |
| 5,859,874 A | 1/1999 | Wiedeman et al. |
| 5,867,109 A | 2/1999 | Wiedeman |
| 5,875,180 A | 2/1999 | Wiedeman et al. |
| 5,884,142 A | 3/1999 | Wiedeman et al. |
| 5,896,558 A | 4/1999 | Wiedeman |
| 5,905,943 A | 5/1999 | Wiedeman et al. |
| 5,912,641 A | 6/1999 | Dietrich |
| 5,918,157 A | 6/1999 | Wiedeman et al. |
| 5,956,619 A | 9/1999 | Gallagher et al. |
| 5,999,623 A | 12/1999 | Bowman et al. |
| 6,021,309 A | 2/2000 | Sherman et al. |
| 6,023,463 A | 2/2000 | Wiedeman et al. |
| 6,023,606 A | 2/2000 | Monte et al. |
| 6,064,857 A | 5/2000 | Wiedeman et al. |
| 6,067,442 A | 5/2000 | Wiedeman et al. |
| 6,072,768 A | 6/2000 | Wiedeman et al. |
| 6,081,710 A | 6/2000 | Sherman et al. |
| 6,085,067 A | 7/2000 | Gallagher et al. |
| 6,091,933 A | 7/2000 | Sherman et al. |
| 6,097,752 A | 8/2000 | Wiedeman et al. |
| 6,101,385 A | 8/2000 | Monte et al. |
| 6,125,260 A | 9/2000 | Wiedeman et al. |
| 6,128,487 A | 10/2000 | Wiedeman |
| 6,134,423 A | 10/2000 | Wiedeman et al. |
| 6,160,994 A | 12/2000 | Wiedeman |
| 6,201,961 B1 | 3/2001 | Schindall et al. |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,272,316 B1 | 8/2001 | Wiedeman et al. |
| 6,272,325 B1 | 8/2001 | Wiedeman et al. |
| 6,272,339 B1 | 8/2001 | Wiedeman |
| 6,301,476 B1 | 10/2001 | Monte et al. |
| 6,418,147 B1 | 7/2002 | Wiedeman |
| 6,463,279 B1 | 10/2002 | Sherman et al. |
| 6,567,645 B1 | 5/2003 | Wiedeman et al. |
| 6,587,687 B1 | 7/2003 | Wiedeman |
| 6,594,469 B1 | 7/2003 | Serri et al. |
| 6,628,921 B1 | 9/2003 | Vaddiparty et al. |
| 6,654,357 B1 | 11/2003 | Wiedeman |
| 6,661,996 B1 | 12/2003 | Wiedeman et al. |
| 6,735,439 B2 | 5/2004 | Bowman et al. |
| 6,735,440 B2 | 5/2004 | Wiedeman et al. |
| 6,775,251 B1 | 8/2004 | Wiedeman et al. |
| 6,775,519 B1 | 8/2004 | Wiedeman et al. |
| 6,804,514 B2 | 10/2004 | Wiedeman et al. |
| 6,985,454 B1 | 1/2006 | Wiedeman et al. |
| 7,099,770 B2 * | 8/2006 | Naden et al. ............ 701/117 |
| 7,142,853 B2 | 11/2006 | Wiedeman et al. |
| 7,180,873 B1 | 2/2007 | Monte et al. |
| 7,630,682 B2 | 12/2009 | Monte et al. |
| 7,672,639 B2 | 3/2010 | Vaddiparty et al. |
| 7,711,320 B2 | 5/2010 | Monte et al. |
| 7,792,487 B2 | 9/2010 | Monte et al. |
| 8,130,096 B2 * | 3/2012 | Monte et al. ........... 340/539.13 |
| 2002/0031102 A1 | 3/2002 | Wiedeman et al. |
| 2002/0031103 A1 | 3/2002 | Wiedeman et al. |
| 2002/0032002 A1 | 3/2002 | Wiedeman et al. |
| 2002/0032799 A1 | 3/2002 | Wiedeman et al. |
| 2002/0039900 A1 | 4/2002 | Wiedeman et al. |
| 2002/0123343 A1 | 9/2002 | Wiedeman et al. |
| 2002/0132578 A1 | 9/2002 | Wiedeman et al. |
| 2002/0132619 A1 | 9/2002 | Wiedeman et al. |
| 2002/0137511 A1 | 9/2002 | Bowman et al. |
| 2002/0142781 A1 | 10/2002 | Wiedeman et al. |
| 2004/0147220 A1 | 7/2004 | Vaddiparty et al. |
| 2007/0155316 A1 | 7/2007 | Monte et al. |
| 2007/0155317 A1 | 7/2007 | Monte et al. |
| 2007/0155318 A1 | 7/2007 | Monte et al. |
| 2007/0155319 A1 | 7/2007 | Monte et al. |
| 2007/0247316 A1 | 10/2007 | Wildman et al. |
| 2008/0113666 A1 | 5/2008 | Monte et al. |
| 2008/0158002 A1 | 7/2008 | Parkinson et al. |
| 2009/0121841 A1 | 5/2009 | Twitchell |
| 2009/0121930 A1 | 5/2009 | Bennett et al. |
| 2011/0140884 A1 | 6/2011 | Santiago et al. |
| 2011/0177790 A1 | 7/2011 | Monte et al. |

OTHER PUBLICATIONS

Patent Cooperation Treaty—International Preliminary Report on Patentability, PCT/US10/53689, Jan. 17, 2012, pp. 1-7.

* cited by examiner

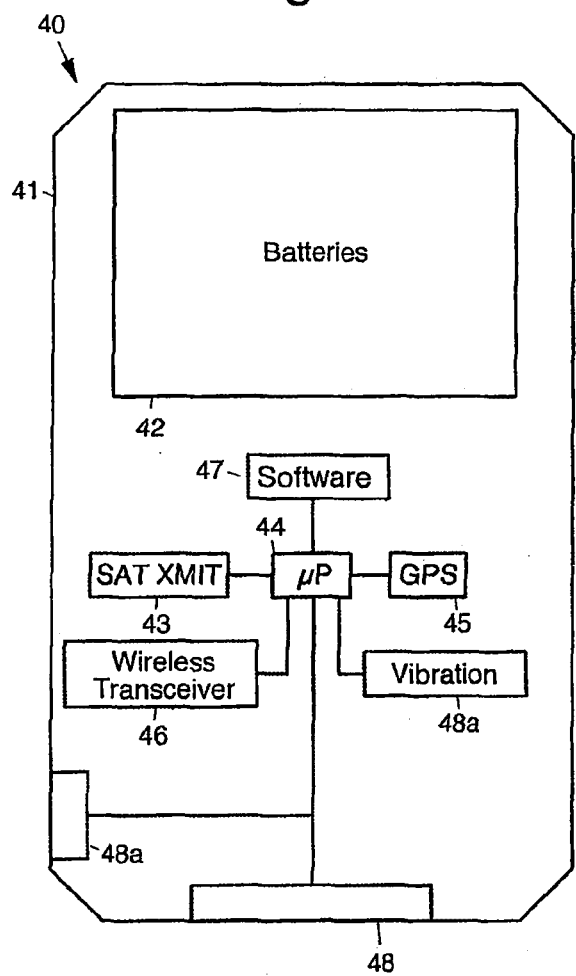
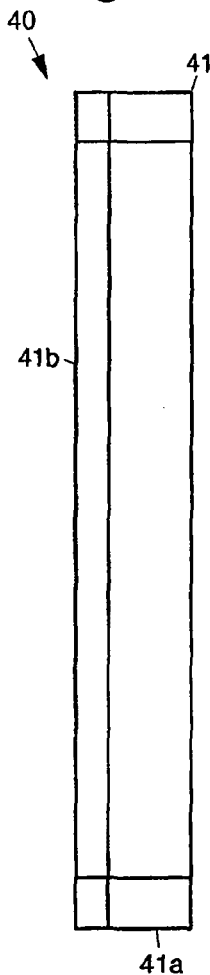
Fig. 3
Fig. 3a
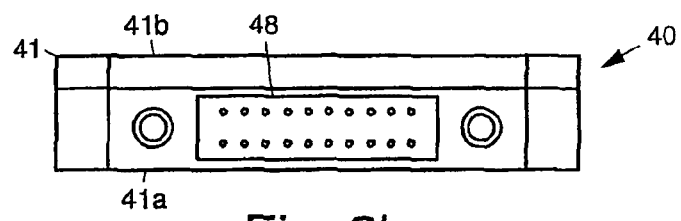
Fig. 3b

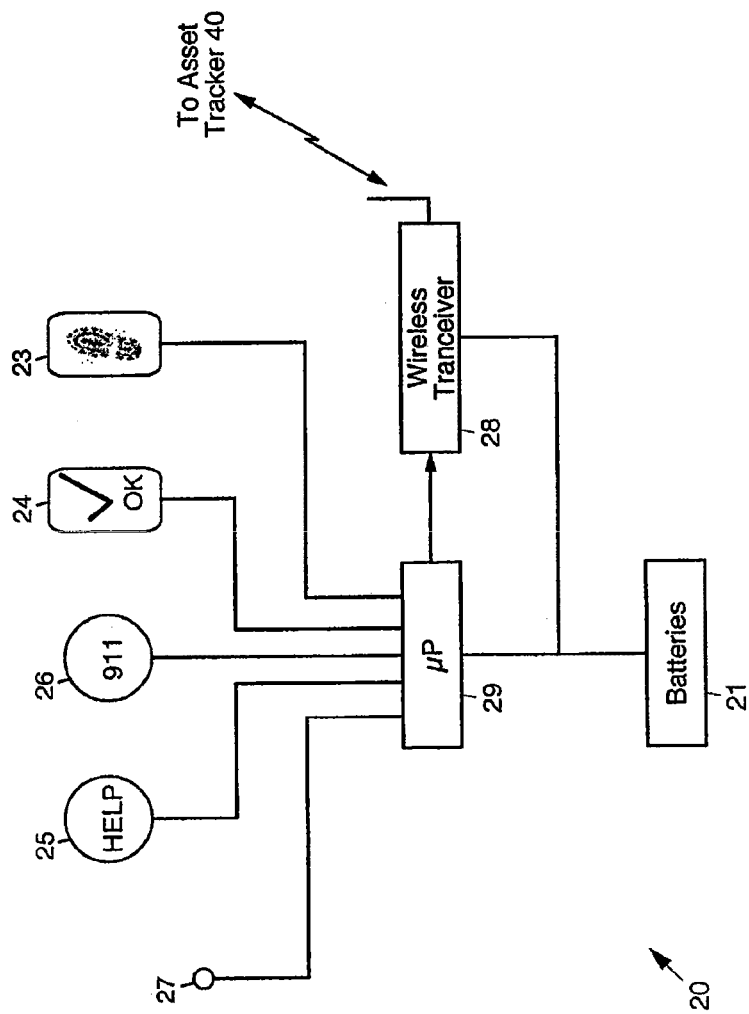

Fig. 7   70

71 — PROVIDING USER-CARRIED APPARATUS HAVING A UNIQUE ID AND THAT COMPRISES A PLURALITY OF BUTTONS THAT ARE SELECTABLE TO GENERATE ONE OF A NUMBER OF OPERATIONAL MODE SIGNALS, A SHORT-RANGE WIRELESS TRANSCEIVER, AND A PROCESSOR

72 — DISPOSING ASSET TRACKING APPARATUS ON AN ASSERT, WHICH APPARATUS COMPRISES A SHORT-RANGE WIRELESS TRANSCEIVER FOR RECEIVING SHORT-RANGE WIRELESS COMMUNICATION SIGNALS HAVING A SHORT-RANGE WIRELESS COMMUNICATION PROTOCOL, A MOTION SENSOR, A GLOBAL POSITIONING SYSTEM (GPS) RECEIVER, A SIMPLEX SATELLITE TRANSMITTER FOR COMMUNICATING WITH A REMOTELY LOCATED PROCESSING CENTER VIA ONE OR MORE COMMUNICATION SATELLITES, AND A PROCESSOR

73 — DETERMINING IF THE ASSET TRACKING APPARATUS MOVES AND AUTHORIZED USER-CARRIED APPARATUS IS OUT OF RANGE

74 — RECEIVING AND PROCESSING GPS SIGNALS IN THE ASSET TRACKING APPARATUS TO GENERATE A LOCATION SIGNAL INDICATIVE OF THE LOCATION OF THE ASSET TRACKING APPARATUS

75 — TRANSMITTING THE LOCATION SIGNAL TO THE REMOTELY LOCATED PROCESSING CENTER VIA THE SIMPLEX SATELLITE TRANSMITTER AND THE ONE OR MORE COMMUNICATION SATELLITES IF THE ASSET TRACKING APPARATUS MOVES AND AUTHORIZED USER-CARRIED APPARATUS IS OUT OF RANGE

76 — TRANSMITTING, USING A WIRELESS COMMUNICATION PROTOCOL, A SIGNAL CORRESPONDING TO THE UNIQUE ID OF AUTHORIZED USER-CARRIED APPARATUS AND A SELECTED OPERATIONAL MODE SIGNAL WHEN A PARTICULAR BUTTON IS SELECTED FROM THE USER-CARRIED APPARATUS TO THE ASSET TRACKING APPARATUS

77 — PROCESSING THE SIGNAL CORRESPONDING TO THE UNIQUE ID IN THE ASSET TRACKING APPARATUS TO DETERMINE IF THE USER-CARRIED APPARATUS IS IN RANGE AND IF IT IS AUTHORIZED TO COMMUNICATE WITH THE ASSET TRACKING APPARATUS

78 — TRANSMITTING THE SIGNAL CORRESPONDING TO THE UNIQUE ID AND A SELECTED OPERATIONAL MODE SIGNAL RECEIVED FROM AN IN-RANGE AUTHORIZED USER-CARRIED APPARATUS TO THE REMOTELY LOCATED PROCESSING CENTER VIA THE SIMPLEX SATELLITE TRANSMITTER AND THE ONE OR MORE COMMUNICATION SATELLITES

79 — PROCESSING AND RETRANSMITTING THE LOCATION SIGNAL AND A MESSAGE CORRESPONDING TO THE SELECTED OPERATIONAL MODE SIGNAL FROM THE REMOTELY LOCATED PROCESSING CENTER TO ONE OR MORE DESIGNATED RECIPIENTS

SIMPLEX PERSONAL AND ASSET TRACKER

This application is a continuation-in-part of U.S. Ser. No. 12/657,470, filed Jan. 20, 2010 and claims the benefit under 35 USC 119(e) of U.S. Ser. No. 61/254,502 filed Oct. 23, 2009, both of which are incorporated by reference herein in their entirety.

BACKGROUND

The present invention relates to apparatus and methods for tracking and locating persons, sending messages, and locating assets.

Vehicle recovery companies include LoJack, ZoomBack, MicroTRAKgps, Mobile Gardian, Trimtrack, OnStar and ATX. The LoJack™ system, for example, provides discrete/covert ability and uses radio frequency communication. Dealers primarily install the LoJack system. Radio technology is inexpensive and the system is relatively easy to install. A tracking PC is used by law enforcement (federal, state, local) who use vehicles, helicopters, or aircraft to recover vehicles, which provides consumer confidence and acceptance. However, the LoJack system has no intranet tracking feature. The MicroTRAKgps system, for example, uses wireless GPS technology and satellite communication to provide for real time tracking. The MicroTRAKgps system is used by original equipment manufacturers including Jaguar, Land Rover and Volvo.

The LoJack asset recovery system is designed to assist in asset recovery. The LoJack system is most often employed with vehicles in which a tracking device is installed. The LoJack system uses cellular communication. The OnStar™ system in an in-vehicle system that may be used for asset recovery, emergency notifications and operator assistance. However, the LoJack and OnStar systems do not permit communication of messages to other individuals such as would provide for sharing of trip-related information, or transmission of messages indicating alerts (such as on/off or open/close alerts), and do not provide for worldwide coverage.

Facts relating to vehicle recovery are that US yearly vehicle thefts are greater than 1 million, which is 1 out of every 190 cars, one about every 26 seconds. The North American theft rate is higher than the rest of the world. Vehicle theft is highest in urban cities. The western US has the highest theft rates in North America (6 out of the top 10 locations). Carjacking is less than 3% of vehicle thefts in North America. A majority of people polled in North America want a vehicle theft recovery devices. By 2010, it is expected that automakers will offer vehicle recovery packages via their dealers.

U.S. Pat. Nos. 7,099,770 and 7,337,061 disclose devices and applications that use cellular communication to provide location information. U.S. Pat. Nos. 7,099,770 and 7,337,061 each disclose, as evidenced by their titles, a "Location monitoring and transmitting device, method, and computer program product using a simplex satellite transmitter." The respective Abstracts indicate that the patents disclose a "device, method, and computer program product for monitoring and transmitting a location and a local status of a remote device using a simplex satellite transmitter. The monitoring device includes a position location unit, a simplex satellite transmitter, a power source, and a controller. The position location unit is configured to determine a location of the remote device. The simplex satellite transmitter is configured to transmit the location to one or more satellites in low earth orbit. The controller includes a power management unit configured to control a power state of the position location unit and the simplex satellite transmitter, and to periodically enable and disable power from the power source to the position location unit and the simplex satellite transmitter."

Thus, U.S. Pat. Nos. 7,099,770 and 7,337,061 each disclose an single-unit monitoring device which is programmed to determine and transmit its location via a low earth orbiting satellite. There is no disclosure in U.S. Pat. Nos. 7,099,770 or 7,337,061 regarding the use of a separate hand-held user-controlled device that communicates with an asset tracking device, which in turn communicates messages from either the hand-held user-controlled device or the asset tracking device via satellite a low earth orbiting satellite.

The assignee of the present invention has previously developed a "SPOT™" tracker that is disclosed in U.S. patent application Ser. No. 12/215,462, filed Jun. 27, 2008. The SPOT tracker is a hand-held user-carried device that embodies a satellite transmitter, amplifier and antenna, and that is carried by a user to allow emergency message communication via satellite to emergency personnel or other remotely-located persons. However, the SPOT tracker cannot be readily used to track assets, such as vehicles or ship containers, for example, unless the user is collocated with the assets. The SPOT tracker is embodied in a single hand-held user controlled device that communicates via a low earth orbiting satellite. The SPOT tracker does not communicate via a secondary device that transmits messages via a low earth orbiting satellite.

It would therefore be desirable to have apparatus and methods that implement personal and asset tracking, and that track and locate persons, send messages, and locate assets. It would also be desirable to have apparatus and methods that permit message communication to non-emergency individuals, sharing of trip-related information, or transmission of alert messages.

BRIEF DESCRIPTION OF THE DRAWINGS

The various features, functionalities and practical advantages of the present invention may be more readily understood with reference to the following detailed description taken in conjunction with the accompanying drawings, wherein like reference numerals designate like structural elements, and in which:

FIGS. 3, 3a and 3b illustrates an exemplary asset tracker device that is collocated with an asset that is to be tracked or monitored;

FIG. 4 illustrates an exemplary system employing the simplex personal and asset tracker;

FIG. 7 is a flow diagram that illustrates an exemplary asset tracking method;

DETAILED DESCRIPTION

Figure 1:
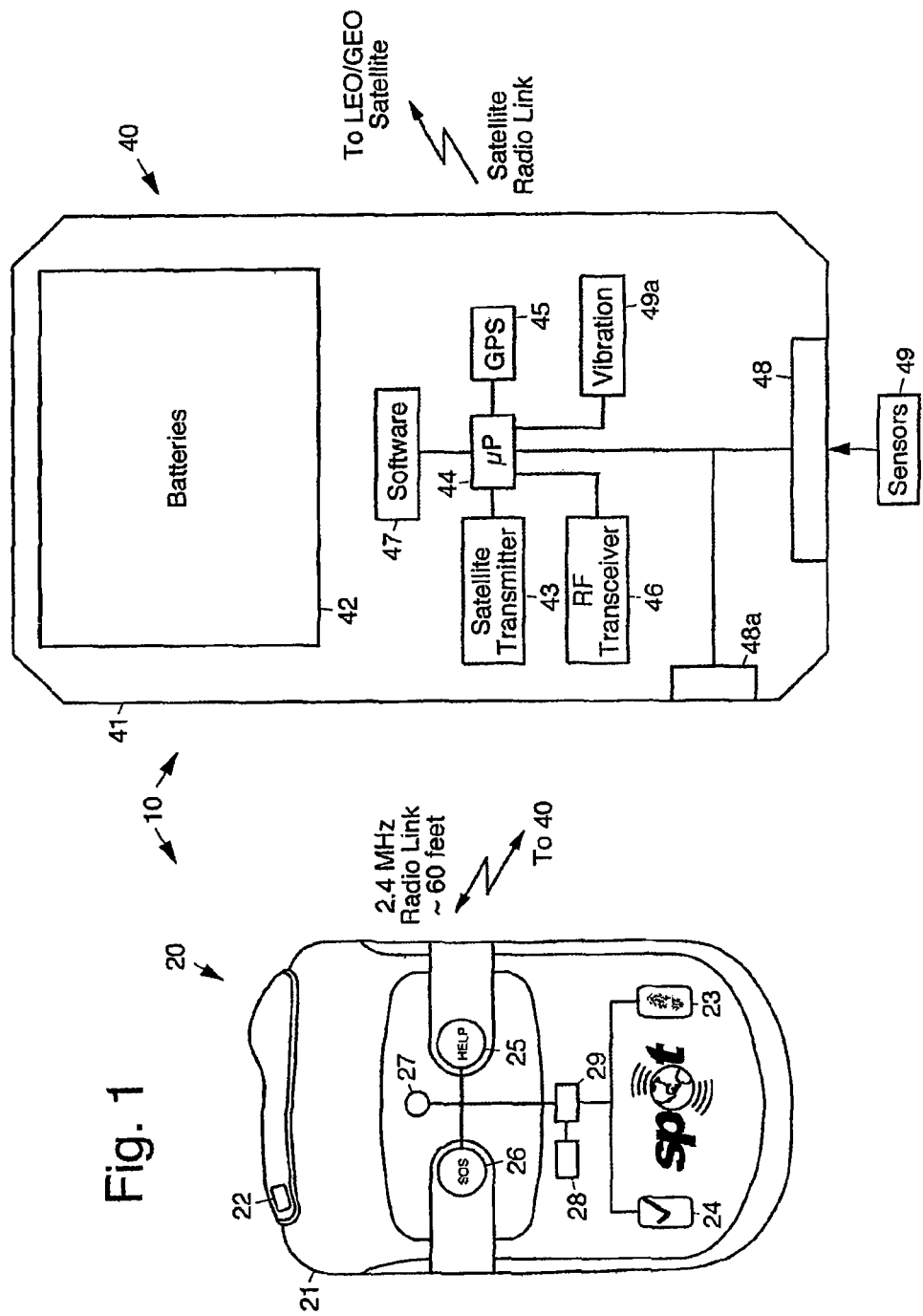
FIG. 1 illustrates an exemplary simplex personal and asset tracker.

Disclosed are apparatus and methods for tracking and locating persons, sending messages, and locating assets. An exemplary embodiment comprises a small user-carried device, or fob, that embodies some or all of the functionality of a SPOT™ tracker disclosed in U.S. patent application Ser. No. 12/215,462, filed Jun. 27, 2008, assigned to the assignee of the present invention, but does not contain a satellite transmitter, amplifier or antenna. The contents of U.S. patent application Ser. No. 12/215,462 are incorporated herein by reference in its entirety. The fob is made relatively small, and may have the size of a car key fob, for example.

The fob wirelessly communicates over a relatively short range with an asset tracking device, or asset tracker, that is attached to an asset, such as a vehicle (car, truck, motorcycle, boat) or ship container, for example. Each fob has a unique ID that the asset tracker uses to identify an authorized user. The asset tracker may be programmed to recognize multiple fobs (IDs), and multiple fobs may be paired with multiple asset trackers, so that multiple users of multiple vehicles, for example, can interface with multiple asset trackers.

The asset tracker has a short-range wireless communication interface for communicating with the fob(s), and a satellite communication interface for transmitting simplex (one-way) messages by way of a satellite to a remote location (network). Alerts regarding asset movement and I/O activity along with messages transmitted from the fob(s) by way of the asset tracker that are received at the remote location (network) are forwarded to a customer who owns or is responsible for the asset or is to receive messages from the user carrying the fob. In addition, the asset tracker may be configured to have a terrestrial wireless network interface, such as cellular interface, to allow communication with the remote location (network) if satellite communication is unavailable.

The user carrying the fob thus has personal tracking functions in a small device as long as the fob is in range of the asset tracker. Alerts and messages transmitted from the fob are relayed by the asset tracker over the satellite link to the network and ultimately to the desired contact. Alerts include emergency messages and tracking messages, for example. If the fob is not in range of the asset tracker, and the asset is moving, the asset tracker can sense this, and it transmits its location to the network and desired contact along with an "unauthorized movement" message that indicates that it could be stolen.

Each fob may be configured to have user-specific functions depending upon the asset to which the asset tracker is attached. Thus, alerts may be transmitted by the asset tracker if the asset travels at an unauthorized speed or to an unauthorized location, for example (i.e., geo-fence). Each alert may include transmit time, location, and fob ID, for example.

The asset tracker is configured to transmit GPS location data to the network if it is in motion and an authorized fob is not substantially collocated with it. Software at the remote location may be configured to process the GPS location data to determine speed and direction of motion of the asset or determine if there is rapid deceleration, indicating a possible accident, or such determinations can be made locally at the asset tracker. Results of this determination may be transmitted to appropriate authorities or to the designated customer.

The asset tracker may be utilized in fixed locations, such as on a race track or at specific locations in a building, for example. When a fob passes by the asset tracker, the fob ID is identified by the asset tracker and reported to the remote site to indicate presence of the fob at that location. This insures that the person or vehicle with the fob has reached a particular location, such as a location along a race track, or a guard passing by a check point in the building. In addition, sensors may be attached to the asset tracker to monitor opening of doors or windows of a vehicle or building, for example.

The asset tracker may be used in other security applications. For example, asset trackers may be placed at strategic locations on a campus, with each student carrying a uniquely-identified fob. Student locations may be identified and tracked as fobs pass by each of the asset tracker locations. The fobs would allow the SPOT personal tracking functions to be used by students, including transmission of 911 emergency and help messages to relevant campus emergency service personnel. Thus, the disclosed apparatus (SpotOn™) and methods provide for an asset tracking GPS device (asset tracker) and a key fob that wirelessly communicates with the asset tracking device. The asset tracking device is mounted to an asset (car, boat, other vehicle or equipment). Alert and tracking information is sent from the asset tracker to a remote network via simplex communication using a satellite. Alerts of asset movement and I/O activity are then sent to the customer. The key fob remote includes many Spot™ features to allow a person within wireless range of the tracking device to press a button and send a request for help, for example.

Figure 2:
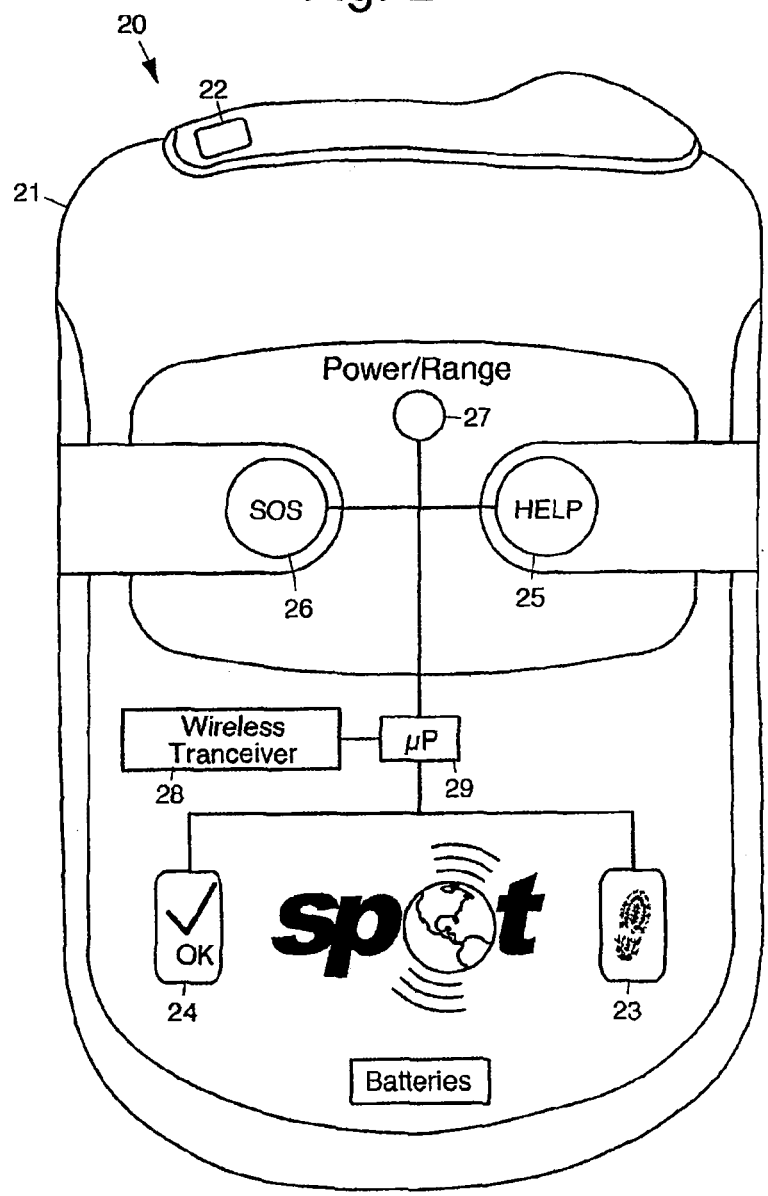
FIG. 2 illustrates an exemplary fob device that is carried by a user.

Referring now to the drawing figures, FIG. 1 illustrates an exemplary simplex personal and asset tracking apparatus 10. The exemplary apparatus 10 has two main components: a fob device 20 that is carried by a user, and an asset tracker device 40 that is collocated with an asset 11 (FIG. 6) that is to be tracked or monitored. FIG. 2 shows an enlarged view of an exemplary fob device 20.

The exemplary fob device 20 is a hand-held user-carried device having a housing 21 with an optional key ring loop attachment 22, a plurality of button-type or membrane-type depressible switches or buttons 23-26, and a multi-color power/range light emitting diode (LED) indicator 27. The multi-color power/range LED indicator 27 is used to indicate fob power and range of the fob 20 from the asset tracker device 40. Each of the buttons 23-26 are preferably backlit with a LED indicator.

Along with FIGS. 1 and 2, FIG. 4 illustrates the electronics contained in the fob device 40. Disposed inside the housing 21 of the fob device 20 are batteries, a short-range wireless transceiver 28 and a microprocessor (μP) 29. The short-range wireless transceiver 28 is coupled to the microprocessor 29, along with each of the buttons 23-26, their backlighting indicators, and the power/range LED indicator 27. The short-range wireless transceiver 28 is preferably a 2.4 MHz radio link having an approximate 60 foot transmission range. The short-range wireless transceiver 27 permits communication between the fob device 20 and the asset tracker device 40.

The depressible switches or buttons 23-26 preferably include a tracking button 23, a check/OK button 24, a help button 25, and an SOS (emergency) button 26. Selected buttons 23-26 may be used in combination to arm a geo-fence and to capture the geo-location of a point of interest, for example, when it is in range of the asset tracker device 40. The microprocessor 29 is programmed to send a wakeup signal to the asset tracker device 40 when it is in proximity of the asset tracker device 40 when the check/OK button 24 is depressed.

A green light emitting diode indicator 27 may indicate that power is adequate for operation, an orange light emitting diode indicator 27 may indicate that power is low, a red light emitting diode indicator 27 may indicate that power is unavailable, and a flashing green light emitting diode indicator 27 may indicate that the fob 20 is within range of the asset tracker device 40 so as to permit transmission of messages from the fob 20 via the asset tracker device 40.

The fob device 20 is configured to operate as a function of the programming of the microprocessor 29. The microprocessor 29 is programmed to implement various operating modes of the fob device 20, which respond to button presses. Operation of the fob device 20 and the different operating modes that the microprocessor 29 may be programmed to provide are discussed in more detail below. Such programming is generally routine for those skilled in microprocessor programming and specifics regarding the programming will not be discussed in detail herein.

The tracking button 23 a puts the asset tracker device 40 in "track mode" or cancels track mode. The check/OK button 24 sends an OK/Check mode message and performs an "in-range" check depending upon how long the check/OK button 24 is pressed. The Help button 25 sends a Help or Cancel Help mode message depending upon how long the button 25 is pressed. The SOS (911 Emergency) button 26 sends a 911 Emergency or Cancel 911 Emergency mode message depending upon how long the button 26 is pressed.

The fob device 20 may be programmed to function in a manner similar to the personal locator device disclosed in U.S. patent application Ser. No. 12/215,462. Details regarding such programming may be found in this patent application, and will not be discussed in detail herein.

FIG. 1 and FIGS. 3, 3a and 3b illustrate an exemplary asset tracker device 40 that is collocated with an asset 11 (FIG. 5) that is to be tracked or monitored. The asset tracker device 40 has a housing 41 that comprises a lower portion 41a and a waterproof cover 41b. The exemplary asset tracker device 40 comprises batteries 42, a satellite transmitter 43 for transmitting simplex (one-way) messages, a microprocessor 44 having software 47, a global positioning system (GPS) receiver 45 and a wireless short range radio frequency (RF) transceiver 46 for receiving signals transmitted by the short-range wireless transceiver 28 in the fob device 20. A connector 48 is accessible from outside of the housing 41 that allows connection of a variety of sensors 49, such as motion sensors, switches indicating door or window opening, for example. In addition a vibration sensor 49a may be included in the asset tracker device 40 to independently sense motion of the asset tracker device 40. A USB connector 48a may be included for laptop programming of the microprocessor 44.

Figure 5:
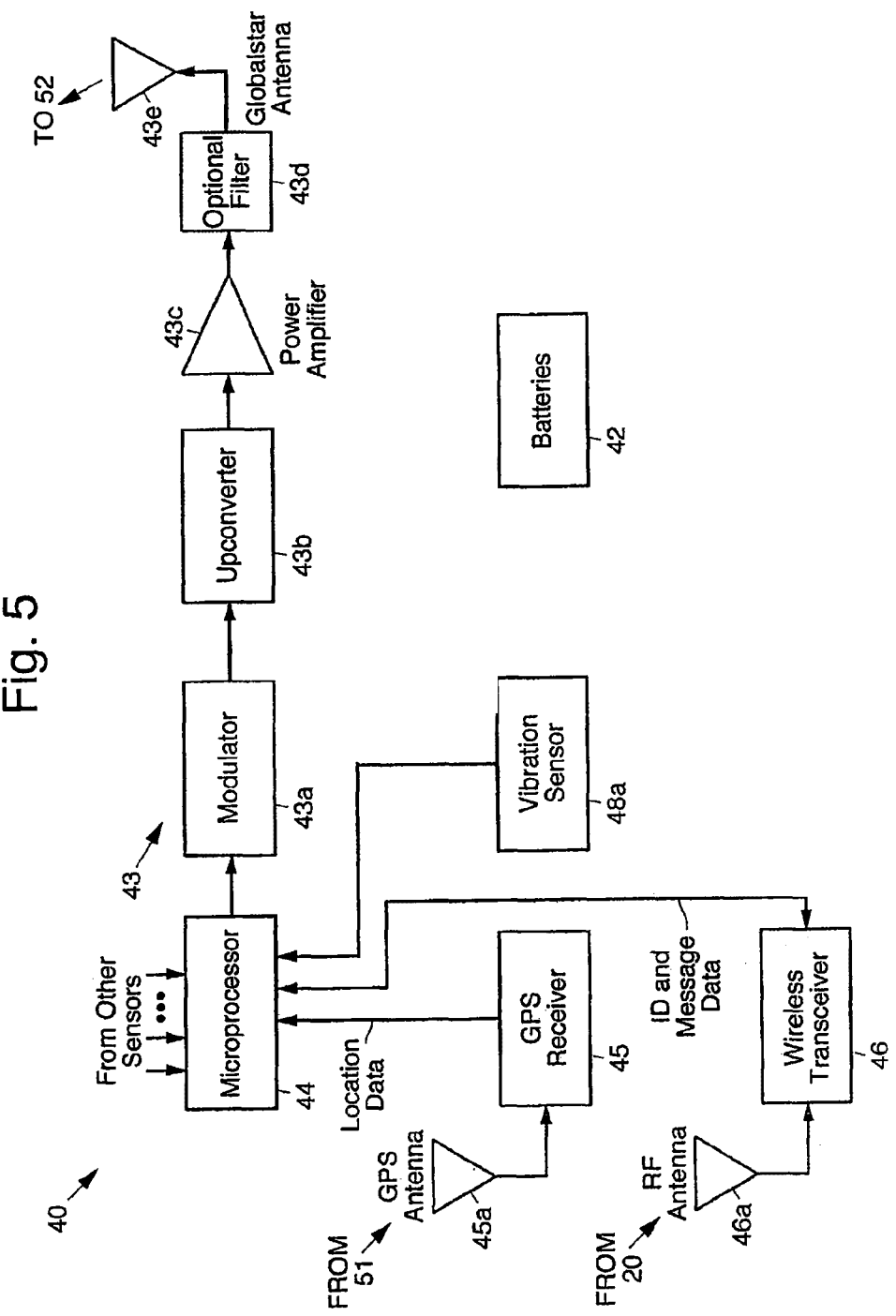
FIG. 5 illustrates details of the electronics employed in the simplex personal and asset tracker.

FIG. 5 shows details of the electronics contained in the exemplary asset tracker device 40. The GPS receiver 45 has an antenna 45a that receives signals transmitted by GPS satellites 51 (FIG. 5). The GPS receiver 45 operates in a conventional manner to receive and process GPS signals to generate location data. The wireless transceiver 46 has an antenna 46a that receives signals transmitted by the short-range wireless transceiver 28 in the fob device 20. The wireless transceiver 46 can also transmit messages to the transceiver 28 in the fob device 20. The GPS receiver 45 and wireless transceiver 46 are coupled to the microprocessor 44.

Figure 6:
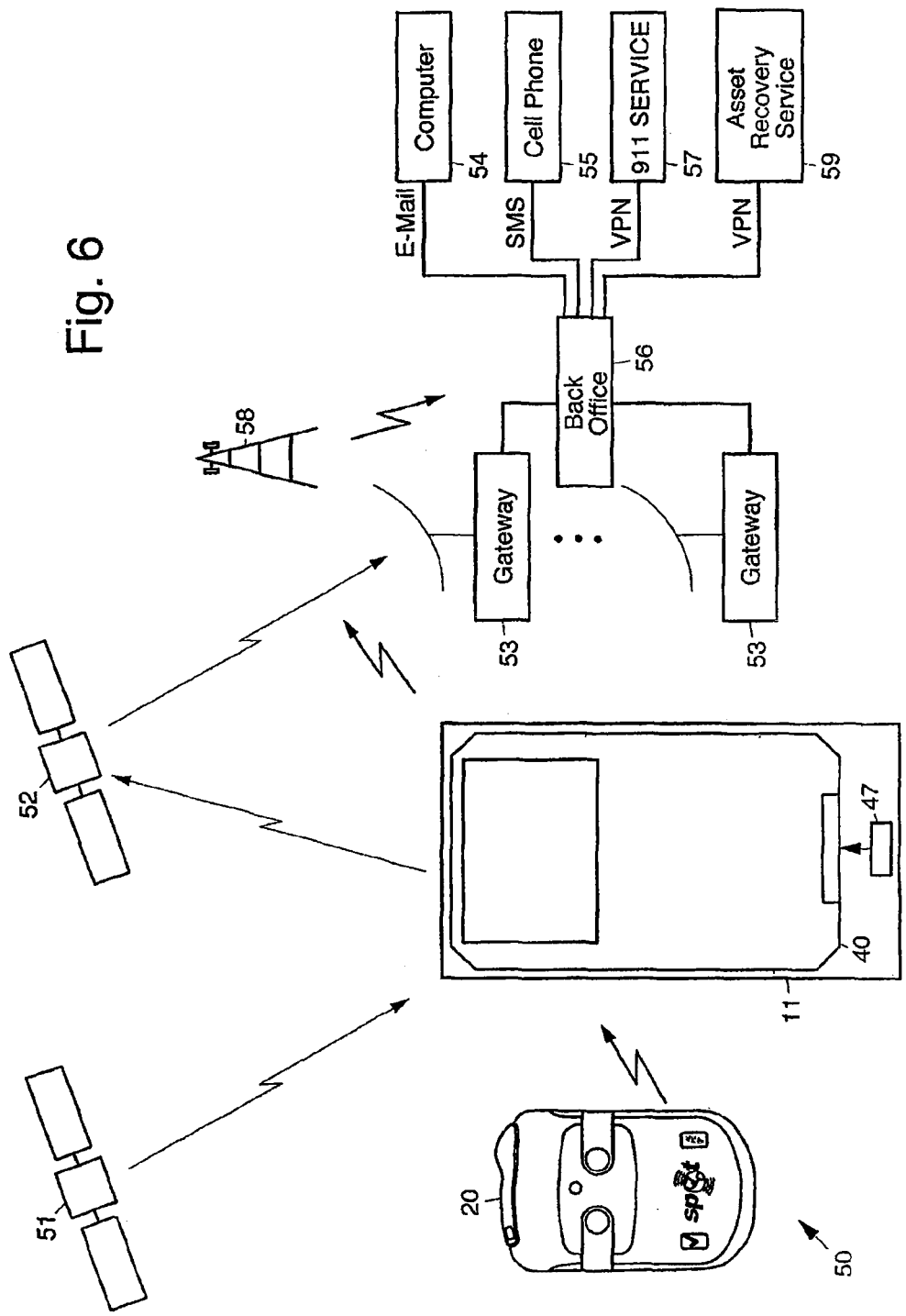
FIG. 6 illustrates components of an exemplary system employing the fob device and simplex personal and asset tracker device.

The microprocessor 44 is configured via software 47 to process signals derived from the GPS receiver 45 and wireless transceiver 46 and generate messages for transmission by way of the satellite transmitter 43 by way of a satellite 52 (FIG. 6) to a remote location (network) 56 FIG. 6). The communication satellite 52 may be one of a number of low earth orbiting (LEO) satellites, or a geosynchronous earth orbiting (GEO) satellite, for example, operated by the assignee of the present invention, for example. The satellite transmitter 43 has an output coupled to the microprocessor 44. The satellite transmitter 43 comprises a modulator 43a. an upconverter 43b, a power amplifier 43c, a filter 43d and a satellite antenna 43e.

The GPS receiver 45 is coupled to a GPS antenna 45a used to receive signals from the GPS satellites 51. Outputs signals from the GPS receiver 45 provide location data indicative of the location of the asset tracker device 40. The location data is input to the microprocessor 44.

The microprocessor 44 outputs signals that are coupled to a modulator 43a. The signal output of the modulator 43a is coupled to an upconverter 43b that upconverts the signal for transmission. The upconverted signal is coupled to an amplifier 43c that amplifies the upconverted signal for transmission. The amplified, upconverted signal is applied to a filter 43d and is coupled to an antenna 43e for transmission to the communication satellite 52.

FIG. 6 illustrates components of an exemplary system 50 employing the fob device 20 and simplex personal and asset tracker device 40. FIG. 6 illustrates components of an exemplary locating system 50 employing the fob device 20, asset tracker device 40, GPS satellites 51, one or more communication satellites 52, and the back office 56. As is shown in FIG. 6, the asset tracker device 40 is disposed on the asset 11. The fob device 20 communicates with the asset tracker device 40 when it is in proximity of the asset tracker device 40 (~60 feet). The asset tracker device 40 GPS receiver 45 receives GPS signals from GPS satellites 51 and processes them to generate location data. The wireless transceiver 46 in the asset tracker device 40 receives signals transmitted by the short-range wireless transceiver 28 in the fob device 20. The satellite transmitter 43 transmits simplex messages comprising the ID and location of the asset tracker device 40 by way of the satellite 52 to the remote location 56. The remote location 56 may be what is referred to as a "back office" which is networked to satellite gateways 53 that communicate with the communication satellite 52. In addition, the back office 56 may receive signals transmitted by the asset tracker device 40 by way of a terrestrial wireless network 58, such as cellular network 58, in the event that satellite communication is unavailable. Software at the back office 56 processes received simplex messages and retransmits them to designated individuals or 911 emergency personnel. For example, the back office 56 is configured to forwards messages to user-designated email addresses (computers 54), short message service (SMS) messages to selected cell phones 55, and to an asset recovery service 59 or 911 emergency service 57 (emergency service provider 57).

The asset tracker device 40 receives GPS signals from the GPS satellites 51 and processes those signals to generate location data. In asset tracking mode, if the fob device 20 is not collocated with the asset tracker device 40, the location data, along with an operating mode signal indicative of the fact that the asset tracker device 40 are configured as a message and transmitted to the one or more communication satellite 32.

The location data, along with an operating mode signal indicative of the motion of the asset tracker device 40, are configured as a message and transmitted to the one or more communication satellite 32. The communication satellite 32 receives the message, translates the message to a different frequency, amplifies the message, and transmits the message to one or more gateways 33. The one or more gateways 33 receive and demodulate the message to produce a digital message, and send the digital message to the back office 56.

At the back office 56, the digital message is processed to determine the location of the asset tracker device 40 and determine, or process the unauthorized movement message transmitted by the asset tracker device 40 indicating that it is moving (and thus the asset 11 has been stolen) and sends it to destinations identified in list of email addresses and cell phone numbers and contacts law enforcement personnel.

If the user is collocated with the asset tracker device 40, and the user depresses one of the communication buttons 23-26 on the fob 20, the location data, along with an operating mode signal indicative of the status of the person using the fob device 20, are configured as a message and transmitted to the one or more communication satellite 32. The communication satellite 32 receives the message, translates the message to a different frequency, amplifies the message, and transmits the message to one or more gateways 33. The one or more gateways 33 receive and demodulate the message to produce a digital message (comprising the GPS location and button information), and send the digital message to the back office 56. At the back office 56, the digital message is processed to determine what to do with the message. If the message relates to an emergency, the back office 56 sends it via a virtual private network (VPN) to the emergency service provider 57 or to the asset recovery service 59; if it is an OK/Help, etc, the back office 56 sends it to destinations identified in list of email addresses and cell phone numbers. If the asset tracker device 40 is in track mode, location data is stored for later processing, or is output to generate a location on a map, for example.

The back office 56 generates an email message that is sent to one or more designated email addresses (computers 54), a short message service (SMS) message that is sent to one or more designated cell phones 55, or an SMS message that is sent to a 911 emergency center 57. Where the message is sent depends upon the situation (mode) that the user is in, i.e., whether the user is OK and is sending his or her location to loved ones or is letting recipient know that he or she has arrived at a destination, that he or she needs help, or that he or she is in a dire emergency situation.

Thus, if the asset 11 moves without the fob 20 then (motion sensor) alerts are generated by the asset tracker device 40, and tracking starts (theft mode). If the asset 11 moves with the fob 20 or the fob 20 is within proximity of the asset tracker device 40, then communication features (i.e., help, SOS) can be used (personal mode).

The primary purpose of the asset tracking apparatus 10 is asset recovery, including cars, motorcycles, boats, construction equipment (including bob cats, generators, boat engines, and the like). During asset tracking and recovery, the fob 20 is beyond the communication range of the wireless link between the fob device 20 and the asset tracker device 40. Preferably, movement of the asset 11 is verified using signals received from multiple GPS satellites 51. This is because of possible movement errors caused by waves, vibration resulting from passing vehicles or a passing train, for example.

Alerts and tracking information are sent to the back office 56 which manages the recovery process for customers. The back office 56 transmits location information to law enforcement personnel. The law enforcement personnel do not need homing beacon hardware such as is required by LoJack, for example. Alerts regarding asset movement are sent to customers via cell and email messages, although asset location data are not necessarily communicated to the customer. I/O sensors 47 are used to connect to external switches such as a bilge pump of a boat, for example. Alerts regarding I/O activity are sent to customers. Alerts regarding I/O are user-settable in terms of duration or I/O activity before an alert is sent.

When the fob 20 is within range of the asset tracker device 40, message communication features are available to the user. Many of the Spot™ features described in U.S. patent application Ser. No. 12/215,462 may be included in the fob 20. The fob device 20 is always on and active, and may be configured so that the power indicator LED 27 blinks green when the asset tracker device 40 is in range, and blinks red when the battery in the fob device 20 is low.

A desired boundary (geo-fence) perimeter distance may be entered into the via physical connection to the asset tracker device 40 using software on a laptop. Latitude/longitude location is set/stored on location. The asset tracker device 40 is programmed to re-center itself at a new location. If the asset 11 is moved to a new job site, for example, a switch may be reset and asset tracker device 40 re-centers itself to that location, using the previously programmed perimeter distance. The boundary (geo-fence) perimeter is the delta longitude and latitude based on the initial GPS reading when the asset tracker device 40 it turned on.

FIG. 7 is a flow diagram that illustrates an exemplary asset tracking method 70. The exemplary asset tracking method 70 is as follows. User-carried apparatus is provided 71 that has a unique ID and that comprises a plurality of buttons that are each selectable to generate one of a predetermined number of operational mode signals, a short-range wireless transmitter, and a processor. Asset tracking apparatus is disposed 72 on an assert, which asset tracking apparatus comprises a short-range wireless receiver for receiving short-range wireless communication signals having a short-range wireless communication protocol, a global positioning system (GPS) receiver, a simplex satellite transmitter for communicating with a remotely located processing center via one or more communication satellites, and a processor.

It is determined 73 if the asset tracking apparatus moves and authorized user-carried apparatus is out of range. GPS signals are received and processed 74 in the asset tracking apparatus to generate a location signal indicative of the location of the asset tracking apparatus. The location signal is transmitted 75 to the remotely located processing center via the simplex satellite transmitter and the one or more communication satellites if the asset tracking apparatus moves and authorized user-carried apparatus is out of range.

A signal corresponding to the unique ID of authorized user-carried apparatus and a selected operational mode signal is transmitted 76 using a short-range wireless communication protocol when a particular button is selected from the user-carried apparatus to the asset tracking apparatus. The signal corresponding to the unique ID is processed 77 in the asset tracking apparatus to determine if the user-carried apparatus is in range and if the user-carried apparatus is authorized to communicate with the asset tracking apparatus.

The signal corresponding to the unique ID and a selected operational mode signal received from an in-range authorized user-carried apparatus are transmitted 78 to the remotely located processing center via the simplex satellite transmitter and the one or more communication satellites. The location signal of the asset tracking apparatus and a message corresponding to the selected operational mode signal are processed and retransmitted 79 from the remotely located processing center to one or more designated recipients.

When the fob 20 is collocated with the asset tracker device 40, in an emergency (911) situation, the apparatus 10 and methods 70 may be used to page for help, sending a users location and an SOS message to an emergency center. Emergency operators at the emergency center respond to the emergency message to notify response agencies such as search and rescue, local 911 operators, the Coast Guard or other government branch, or other emergency responder.

When the fob 20 is collocated with the asset tracker device 40, and in situations where a person wants to notify others that he or she is okay, a "SPOTCheck" function sends the location and an "OK" message to identified friends and family. The track mode may be used to let people know that you have arrived at a destination, or to save unlimited waypoints to a web page using Google™ Maps, for example. Also, the apparatus 10 and methods 70 may implement a "SPOTCast" function that broadcasts the user's location to the user's web page. Using Google™ Maps, for example, on the web page, allows others to access and watch the user's progress, for example.

Preferred embodiments of the systems 50 and methods 70 send the GPS coordinates of the asset tracker device 40 (an hence the asset 11) via satellite 52 to another location without relying on cellular systems. The systems and methods are user controlled. The user determines and controls who gets transmitted messages, and when and where they are sent. The web service, for example, allows the user to change preferences anytime. In 911 situations, the systems 50 and methods 70 allow the user to send location coordinates to a emergency service center 56. The emergency service center 56 notifies emergency responders such as local 911, Coast Guard or other rescue services, so that help can be sent. This option may be used in life threatening or other critical emergencies. The user's location is determined by the GPS coordinates of the asset tracker device 40 and sent to the emergency service center 56.

As described above, when the fob is close to the asset tracker, movement of the asset tracker is considered authorized. When the distance between the fob and the asset tracker is too large to have successful radio communications between the two devices, the asset tracker is programmed to treat any movement as "unauthorized." The distance the fob can be from the asset tracker and still "authorize" movement of the asset is determined by factors such as the power of the radio transmissions, the mounting location of the asset tracker, and how the fob is carried or placed on or near the asset. In many embodiments, the transmission distance may be on the order 50 meters to a few hundred meters (e.g., less than 500 meters). However, there may be specialized embodiments where it is desired to have shorter or significantly greater transmission distances, e.g., up to a kilometer or possibly several kilometers.

In certain embodiments, when the asset tracker determines that "unauthorized movement" (described below) is occurring, it sends messages across a wireless network (e.g., a LEO satellite network) which may be routed to various other communication paths, nonlimiting examples of which include e-mails, web sites, or cell phones as suggested in FIG. 6. One example of the messages transmitted may indicate that "unauthorized" movement of the asset is occurring and the messages may additionally contain information about the location of the asset.

In many embodiments described below, "asset tracker" may also be referred to as an "asset locator," suggesting that continuous "tracking" of an asset, while often desirable, is not necessary in all embodiments, some of which may send location data only once or a few times as opposed to continuous "tracking." However, "asset tracker" and "asset locator" may generally be considered interchangeable terms as used herein unless indicated to the contrary. Certain embodiments of the asset locator will generally comprise (a) a wireless receiver capable of receiving an identifier signal transmitted from a short range wireless transmitter device; (b) a wireless transmitter capable of transmitting a message to a non-local network; (c) a positioning system capable of determining the location of the locator device; (d) an event sensor detecting an event indicating use or imminent use of an asset with which the asset locator is associated; and (e) a controller. In these embodiments, the controller is programmed to instruct the asset locator to perform the following steps: (i) attempt to detect the identifier signal from the transmitter device if the event sensor indicates a positive condition; and (ii) transmit a signal, including an asset location, to the non-local network if: (1) the identifier signal is not detected; and (2) the location of the asset changes.

Figure 8:
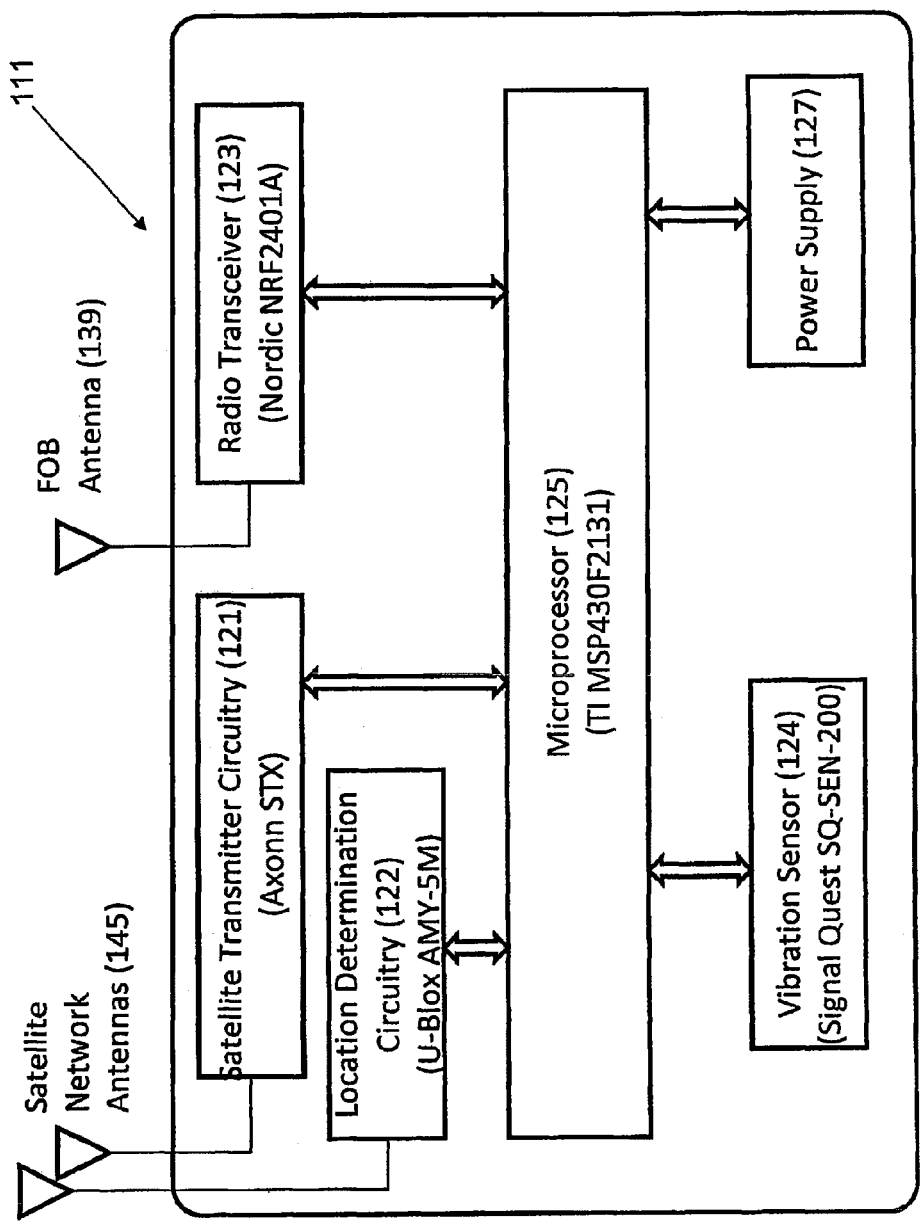
FIG. 8 is a block diagram of the circuitry elements of an alternate embodiment of an asset tracker device.

FIG. 8 illustrates these components in another embodiment of such an asset locator 111. Although the wireless receiver for receiving the identifier signal could be a receiver only, FIG. 8 illustrates the receiver as transceiver 123 which may operate in either a receiver or transmitter mode. As used herein, the terms "receiver" and "transmitter" include i) separate circuitry acting exclusively as a receiver or transmitter, respectively, and ii) a transceiver operating in a receive or transmit mode. In the particular embodiment of FIG. 8, transceiver 123 is a Nordic NRF2401A device. Transceiver 123 will be connected to antenna 139.

The wireless transmitter capable of transmitting a message to a non-local network can be any device for transmitting a signal to a network which covers a large geographic area. The non-local network may be a terrestrial network, such as a cellular phone network, Wi-Max network, Wi-Fi network or a satellite based network, such as the GlobalStar LEO satellite network or the Iridium geo-stationary satellite network. In FIG. 8, the particular transmitter is a GlobalStar/Axonn STX transmitter 121 for transmitting to an LEO satellite network. The networks may be non-local in the sense that they are capable of long-range wireless transmissions (e.g., cellular and satellite networks). Alternatively the networks may also be non-local in the sense that the networks are capable of transferring data over a long range though multiple network pathways such as the Internet (e.g., Wi-Fi has a short wireless transmission distance, but provides a communications path for long distance transmission of data via the Internet). The satellite transmitter will have an antenna associated with it (e.g., satellite network antenna 145 in FIG. 8), which as one nonlimiting example, may be the GlobalStar/Axonn STX transmitter utilizing a patch-type antenna. However, the antenna may be a dual antenna or separate antennas for each of the positioning system and the non-local network. Likewise, the antenna could be an active type or a passive type.

The positioning system could be a global navigation satellite system—GNSS—(e.g., GPS, Galileo, Glonass), a cellular-based navigation system (e.g., Uplink Time Difference of Arrival—UTDOA or Advance Forward Link Trilateration—AFLT), LORAN, or potentially any other conventional or future developed positioning system. In the embodiment of FIG. 8, the positioning system is stand alone GPS enabling circuitry 122 such as a U-bloxs AMY-5M component. In this embodiment, the positioning system will receive signals through the GPS satellite network antenna 145.

Nonlimiting examples of the use event sensor include a vibration sensor, a pressure or force sensor in a driver's seat associated with the asset, an engine start sensor detecting the start or running of an engine associated with the asset, a wheel rotation sensor detecting the rotation of a wheel associated with the asset; or a door sensor detecting the opening of a door associated with the asset. Likewise, the use event sensor could include the asset locator receiving any type of data (via a hardwired or wireless connection) from the asset's (i.e., a vehicle) onboard diagnostics system which indicates the asset is in use. In a preferred embodiment, the use event sensor is a Signal Quest SQ-SEN-200 vibration sensor 124 (FIG. 8) which may be used to detect when the asset might be moving, the starting of an engine associated with the asset, or other events which cause asset vibration. As suggested above, the use event sensor need not be hardwired to the asset locator, but could be a wireless use event sensor positioned apart from the main asset locator housing and sending a radio (or other wireless) signal to the asset locator when a use event is detected.

The controller may be any conventional or future developed processor (typically a microprocessor) which is capable of carrying out the functions described herein. In the FIG. 8 embodiment, the controller 125 is a Texas Instruments MSP430F2131 microprocessor. The asset locator will also include a power supply 127, which in a preferred embodiment is a battery positioned within the housing encasing the other asset locator components or a dedicated battery position outside the asset locator housing. However, alternate embodiments could employ an external power source, for example the battery of a motorized vehicle to which the asset locator is attached, a mobile A/C system, solar panels positioned on or near the asset, or any other conventional or future developed power source.

As described above, many embodiments of the asset locator will be used in conjunction with a hand-held wireless signaling device. Although hand-held signaling device could take on virtually an infinite number of configurations and still be hand-held, in the illustrated embodiment of FIG. 9, the hand-held wireless signaling device is another version of the previously described fob. These embodiments of fob 112 will generally include (a) a controller; (b) a handling sensor connected to said controller; and (c) a short range wireless communication circuit connected to said controller. In one particular embodiment, the controller has programming (i) includes a sleep mode and a wake mode; (ii) transitions from sleep mode to wake mode upon receiving an interrupt signal from the handling sensor; and (iii) in the wake mode, enables the wireless communication circuit to transmit or receive a wireless signal.

Figure 9:
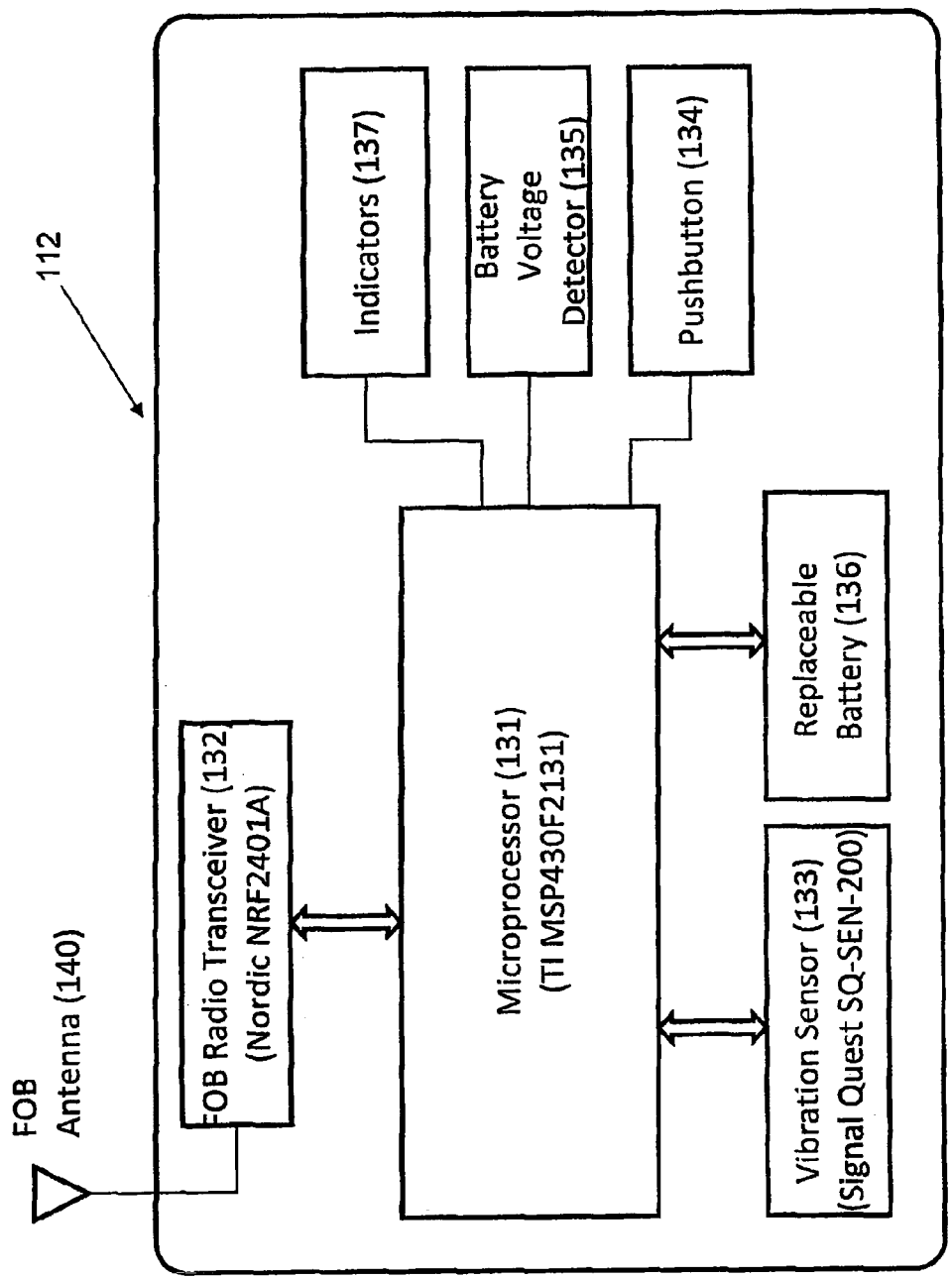
FIG. 9 is a block diagram of the circuitry elements of an alternative embodiment of a wireless fob.

The controller of fob 112 could be any conventional or future developed software controlled processor (or alternatively hardwired circuitry) which is capable of carrying out the functions described herein. In FIG. 9, the controller is a microprocessor 131, one example of which could be a MSP430F2131 available from Texas Instruments of Dallas, Tex.

The short range wireless communication circuit is shown as radio transceiver 132 in FIG. 9 (one example of which is the NRF2401A available from Nordic Semiconductor, Inc. of Sunnyvale, Calif.), but in certain embodiments could be exclusively a receiver or exclusively a transmitter. Many different communication protocols could be employed, but nonlimiting examples include the identifier signal being transmitted in either a Bluetooth specification format, a Zigbee specification format, or an Ember specification format. The Zigbee format utilizing the beaconing mode is one particular example.

Nonlimiting operating frequencies could include one or more RF frequencies such as the 400, 900, or 2400 MHz range. Nor is the communication circuit limited to radio frequency devices, but could also be other wireless communication systems (e.g., infra-red receivers/transmitters, laser transmission, magnetic loop communication, or other conventional or future developed communication systems). One embodiment of the communication circuit is short range in the sense that its range is generally under about 500 meters or alternatively, under about 1 kilometer (e.g., an industrial complex being an area in which asset used is "authorized"). However, other embodiments may have a "short range" transmission distance on the order of 1 to 10 kilometers (or any sub-range therebetween) in certain specialized applications (e.g., a military reservation being the area in which asset use is "authorized"). The communication circuit may also be short range in the sense that it transmits at relatively low power (e.g., less than about 100 mW, less than about 50 mW, less than about 10 mW, or less than about 5 mW). The antenna 139 will connect to transceiver 132. In embodiments where the fob 123 is used in conjunction with asset locator 111, the fob's wireless communication circuit transmits an identifier signal which is uniquely associated with the asset locator. As nonlimiting examples, the identifier signal may be encoded using a small-footprint block encryption algorithm such as the SDSC Encryption/Authentication (SEA) System, the Data Encryption Standard (DES) algorithm, the Advanced Encryption Standard (AES) algorithm, or other conventional or future developed encryption or encoding algorithms.

In certain embodiments, the fob 112 may act as part of a "proximity sensor" system; e.g., a sensor system emitting an electromagnetic or electrostatic field, or a beam of electromagnetic radiation (infrared, for instance), and looking for changes in the field or return signal. Such sensors include Received Signal Strength Indicator (RSSI) systems which may operate through protocols such as Bluetooth "Low Energy" or WiFi Direct. In one example, fob 112 transmits a short-range or low-power signal and asset locator 111 includes a RSSI sensor and utilizes the received signal strength to judge whether the fob 112 should be considered "present" or within an acceptable range such that movement of the asset locator is considered authorized.

Alternatively, many devices having other primary functions may act in place of the fob 112 (i.e., as an alternative short range wireless transmitter). As one non-limiting example, a telecommunications device such as a conventional smart phone may transmit an identifier signal as described above (e.g., through the phone's local wireless communication circuitry utilizing a Bluetooth protocol). In one embodiment, the asset locator confirms the telecommunications device's presence either by simply receiving the signal (at any strength) or by receiving a signal at a given signal strength as determined by a RSSI sensor. In another embodiment, the RSSI sensor may reside on the telecommunications device and the telecommunications device sends a message to the asset locator confirming that the telecommunications device has received a signal of an acceptable strength from the asset locator.

Although the fob 112 (and other short range wireless transmitters) described above have been active transmitting devices (i.e., devices have a power source and capable of transmitting a signal without necessarily receiving a signal), the definition of short range wireless transmitter as used herein may include a passive transmitter such as a radio frequency identification (RFID) tag or device. In such an embodiment, the fob 112 might consist primarily of an RFID tag which upon receiving a signal from the asset locator, would reflect a signal containing a particular identification code.

The handling sensor in FIG. 9 is a vibration sensor 133 such as a model designation SQ-SEN-200 sensor available from SignalQuest, Inc. of Lebanon, N.H. However, the handling sensor is not limited to vibration sensors and could alternatively be a capacitive touch sensor, an accelerometer, a velocity sensor, an optical sensor, or other sensor type which detects a user handing the fob 112. Certain preferred embodiments of fob 112 illustrated in FIG. 9 could further include LED indicators 137, battery voltage detector 135, one or more push buttons 134, and battery 136 (typically a replaceable battery, but alternatively a permanent battery, rechargeable or otherwise).

Many embodiments of both the asset locator 111 and fob 112 use various power management strategies to conserve battery power. As an example related to the asset locator, the use event sensor (vibration sensor 124 in FIG. 8) indicates the use or imminent use of the asset. When the asset locator's vibration sensor 124 senses movement (i.e., the "use event"), controller 125 enables the transceiver 123 to detect the identifier signal transmitted from the fob 112. If (i) the identifier signal is not detected; and (ii) one or more location fixes from the GPS circuitry indicate a location change of the asset, then the controller instructs the satellite transmitter 121 to transmit a signal, including an asset location, to the satellite based network. Likewise, when the asset locator's vibration sensor signals indicate that the asset is not moving, this embodiment of the asset locator reduces the rate it enables the receiver to detect whether the fob is nearby and reduces the rate at which it attempts to obtain GPS fixes. Various examples illustrating this aspect are explained in more detail below. Alternatively the asset locator's controller 125 may simply remain in the sleep mode and make no attempt to detect the fob or obtain GPS fixes unless and until the controller 125 receives a signal from the vibration sensor. In the above embodiment, the asset locator 111 attempts to detect the fob identifier signal by enabling the receiver (receiver circuitry in the transceiver).

Similarly, to conserve the fob 112's battery power (FIG. 9), certain embodiments of the fob use signals from its vibration sensor 33 to determine when the fob might be in use. When the fob's vibration sensor signals indicate that the fob is not in use, the fob keeps itself in a low power sleep mode.

Although certain embodiments of the present invention relate to a system comprising both the fob 12 and the asset locator 111, other embodiments may relate to either of these devices standing alone. In particular, the power management features of the fob 112 could be applied to innumerable handheld (typically short range) transmitter or receiver devices.

One example of the "vibration sensor" interrupt routine suitable for the fob 112 may be understood in reference to the embodiment of FIG. 9. The vibration sensor 133 in the fob is electrically wired to an interrupt connection on the fob's microprocessor 131, so as to cause an interrupt when the sensor shorts its electrical contacts due to the vibration. The "vibration sensor" interrupt puts the fob's microprocessor 131 into a powered up state, so the interrupt handler code can be executed. One example of the interrupt handler code associated with the interrupt is a "vibration state" subroutine that:
1) inhibits excessive vibration sensor interrupts by implementing a low-pass filter (e.g., 1-5 Hz), and
2) increments a count of the number of vibration sensor interrupts received, and
3) compares the count number during a time period (e.g., 1 minute) with a preset value (e.g., 5), and
4) if the preset value is exceeded, sets the "vibration state" to "in vibration," or
5) if the preset value (e.g., 5) is not exceeded during a time period (e.g., 1 minute), sets the "vibration state" to "at rest".

Another embodiment of fob 112 includes a scheduler routine. The "wake-up" interrupt timer in the fob's microprocessor 131 is programmed to schedule wake-ups of the microprocessor based on the "vibration state" of the fob. If the fob's "vibration state" is "at rest" the fob's microprocessor 131 is programmed to remain in a low power sleep mode between "vibration sensor" interrupts to extend the fob's battery life.

If the fob's "vibration state" is "in vibration" the fob's microprocessor 131 is programmed to perform a "wake-up" interrupt periodically (e.g., 3 seconds plus or minus 1 second). The wake up dither (1 second) is to insure that fob timing does not accidentally synchronize in a detrimental way with the asset locator's microprocessor 125's timing. The "wake up" interrupt handler code is a "wake up" subroutine that:
1) inhibits "vibration sensor" interrupts during the processing of the "wake-up" routine, and
2) enables the fob's radio transceiver 132,
3) causes a short duration (e.g., 500 to 600 microsecond), low power (e.g., 1 milliwatt), encrypted ID beacon transmission that can be received by the asset locator's radio transceiver 123,
4) disables the fob's radio transceiver 132, and
5) puts the fob's microprocessor 131 into a low power sleep mode.

The distance the fob can successfully send a transmission to the asset locator is determined by the transmit power, the particular mounting location of asset locator on the asset, and the particular position of the fob relative to the asset. The disabling of circuitry and the placing of the fob's microprocessor into sleep mode at the end of the "wake-up" subroutine is to conserve battery power.

Figure 10:
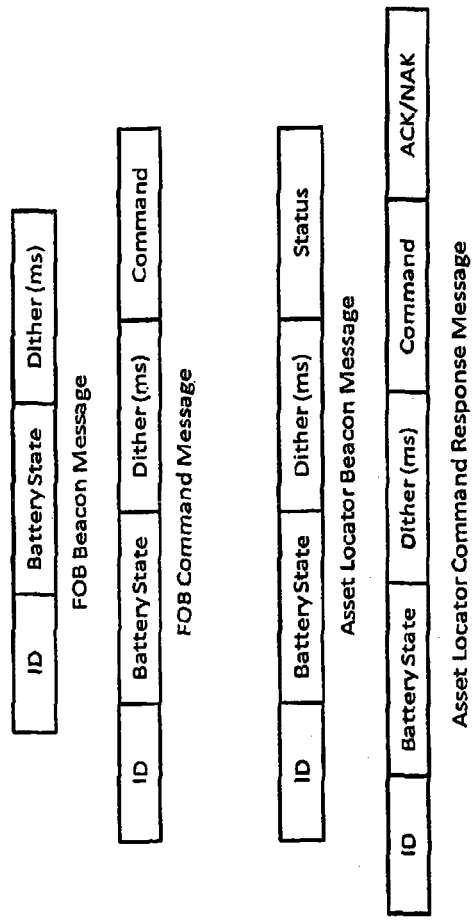
FIG. 10 illustrates example messages generated by the fob and asset tracker.

As suggested in FIG. 10, the messages transmitted by certain embodiments of fob 112 ("beacon messages") will include an ID allowing a nearby asset locator to distinguish between its fobs and fobs that are associated with other asset locators. This example of a fob beacon transmission also contains information about the condition of the fob's battery state and a dither time. The dither time functions to randomize repeat transmissions of the beacon message so that multiple fobs in the same vicinity do not cause excessive interference with one another. The message may further include instruction bits that when set to zero, indicate that the transmission is simply a beacon to let the asset locator know it is nearby and the message does not contain transmission of an instruction to the asset locator.

Embodiments of fob 112 having push buttons 134 allow the buttons to be pushed individually or in a combination and send one of a set of instructions to the asset locator. FIG. 10 illustrates one example of a "command" message for sending instructions to the asset locator. In addition to ID, battery state, and dither information, when a command is send, the instruction bits are set to a value corresponding to a particular command. Naturally, many different instructions could be sent to the asset locator, thereby causing the asset locator to transmit certain information to the nonlocal network. Non-limiting examples of such commands include an emergency help message or a position tracking message (e.g., functions similar to those sent by the SPOT Satellite Messenger available from Globalstar, Inc. of Covington, La.).

Each push button 134, is wired to one of the interrupt connections on the fob's microprocessor 131. The "push button" interrupts put the fob's microprocessor 131 into a powered up state, so the interrupt handler code can be executed. One example of an interrupt handler code associated with the interrupt is a "push button" subroutine that:
1) inhibits "vibration sensor" interrupts while the "push button" subroutine is being executed, and
2) inhibits "wake-up" interrupts, which suspends periodic sending of the fob's beacon pings while the "push button" subroutine is being executed, and
3) sets the instruction bits according to the particular button or combination of buttons pushed, and
4) enables the fob's radio transceiver's receiver to receive a beacon transmission from the asset locator's transceiver 123, and
5) if a beacon transmission is not received within a certain time period (e.g., 5 seconds), illuminates one of the fob's indicators 137 to indicate the fob's did not successfully communicate with the asset locator, disables the fob's radio transceiver's receiver, waits a period of time (e.g., 5 seconds), puts the fob's circuitry including the fob's microprocessor 131 into a low power sleep mode, and exits the "push button" subroutine, or 6) if an information transmission is received, causes a short duration (e.g., 500-600 microsecond), low power (e.g., 1 milliwatt), encrypted ID instruction transmission that can be received by the asset locator's radio transceiver 123 to be sent within the time period that the receiver of the asset locator's transceiver 123 is enabled and looking for fob transmissions, and 7) disables the fob's radio transceiver's transmitter, and 8) enables the fob's radio transceiver's receiver to receive an information transmission from the asset locator's transceiver 123, and 9) if an information transmission is not received within a certain time period (e.g., 6 seconds), illuminates one of the fob's indicators 137 to indicate the fob's did not successfully communicate with the asset locator, disables the fob radio transceiver's receiver, disables the fob's radio transceiver, waits a period of time (e.g., 5 seconds), puts the fob's circuitry including the fob's microprocessor 131 into a low power sleep mode, and exits the "push button" subroutine, or 10) if an information transmission is received, the fob's radio transceiver's receiver is disabled and the contents of the information transmission are analyzed to determine if the sent instruction has been executed by the asset locator, and 11) if the instruction has been executed, disables the fob's radio transceiver 132, and puts the fob's Microprocessor 131 into a low power sleep mode and exits the "push button" subroutine, but 12) if the instruction has not been executed, immediately enables the fob's radio transceiver's transmitter and transmits the instruction again, disables the fob's radio transceiver's transmitter, enables the fob's radio transceiver's receiver, and 13) loops back to step (4) three (e.g., 3) times, and then 14) illuminates one of the fob's indicators 137 to indicate the fob cannot successfully get the asset locator to execute the instruction, disables the fob's radio transceiver's receiver, disables the fob's radio transceiver, waits a period of time (e.g., 5 seconds), puts the fob's circuitry including the fob's microprocessor into a low power sleep mode, and exits the "push button" subroutine.

The fob transmission contains the instruction bits set according to which button or combination of buttons was pushed (indicating it is giving an instruction to the asset locator). The disabling of circuitry and putting the fob's circuitry and microprocessor into a low power sleep mode at the end of the "push button" subroutine is to conserve battery power. FIG. 10 further illustrates example contents of an asset locator beacon message and command response message. In addition to ID, battery state, and dither information, the asset locator beacon message may be utilized to transmit the asset locator status, which indicates the current operational mode of the asset such as Track mode, Help mode, etc. The asset locator beacon message functions in part to notify the fob when the asset locator's receiver is enabled and capable of receiving transmissions. The command response message may be utilized to acknowledge to the fob that a command has been received and carried out.

Although several previously described embodiments contemplate an asset locator 111 employing a vibration sensor (or another use event sensor) for power management reasons, other embodiments of the asset locator would function without a use event sensor. In this embodiment, the asset locator's controller will (i) determine a first location from the positioning system; (ii) subsequently determine a second location from the positioning system; (iii) compare the first and second location; and then (iv) transmit the asset location to the non-local network if: (1) the comparison of locations indicates a change in location, and (2) the fob's identifier signal has not been detected.

One variation of this embodiment envisions the asset locator's controller periodically obtaining location fixes from the positioning system in order to determine whether a change in location has occurred. As used herein, "periodically" does not necessarily mean a set intervals, but also includes any series of location fixes taken over a time interval, even if the location fixes are not taken at evenly spaced divisions of the time interval.

Although not necessary in every embodiment, often an asset locator without a use event sensor will have an external connection to a power source associated with the asset. For example, if the asset were an automobile, the asset locator would have a power supply line for connection with the automobile's battery (or more generally the automobile's electrical system). While an external power source may generally be more advantageous when the asset locator lacks a use event sensor, this in no way precludes asset locators with use event sensors from connecting to an external power source.

Another embodiment of the present invention is a method of detecting an unauthorized location change of an asset. The method comprising the steps of: (a) detecting whether the asset has experienced vibration; (b) if the asset has experienced vibration, enabling a receiver to receive a wireless transmission of an identifier signal associated with the asset; (c) if the identifier signal is not received, determining whether the asset has changed location; and (d) if a change of location is detected, transmitting one or more updated locations of the asset to a non-local network.

Another embodiment of the invention is a method of detecting an unauthorized location change of an asset equipped with a controller-based security device comprising the steps of: (a) sending an interrupt signal to the controller upon detection of a use event; (b) enabling a receiver to receive a wireless transmission of an identifier signal associated with the asset; (c) if the identifier signal is not received, determining whether the asset has changed location; and (d) if a change of location is detected, transitioning the controller into an unauthorized use state. In this embodiment, the change of location determination may be made by the GPS unit taking location fixes at different times and a comparison of the differences in the location fixes made to determine whether the difference exceeds the maximum error distance of the GPS system being used. Of course, other indicators of location change are within the scope of invention, for example the difference between two or more GPS location fixes exceeding a preset value not associated with the accuracy of the GPS receiver. For example, if the asset is not intended to be used outside a construction site having a 100 meter radius, a change of location would be indicated if two location fixes indicated movement of over 100 meters. Alternatively, a change of location could be detected without fully determining the position of the asset. For example, GPS pseudo-ranges could be compared and if the pseudo-ranges change too rapidly (i.e., more than could be accounted for by satellite movement), a change of location would be indicated. As a still further alternative, a change of velocity of the asset could be used to determine a "change of location" as used herein.

Figure 11:
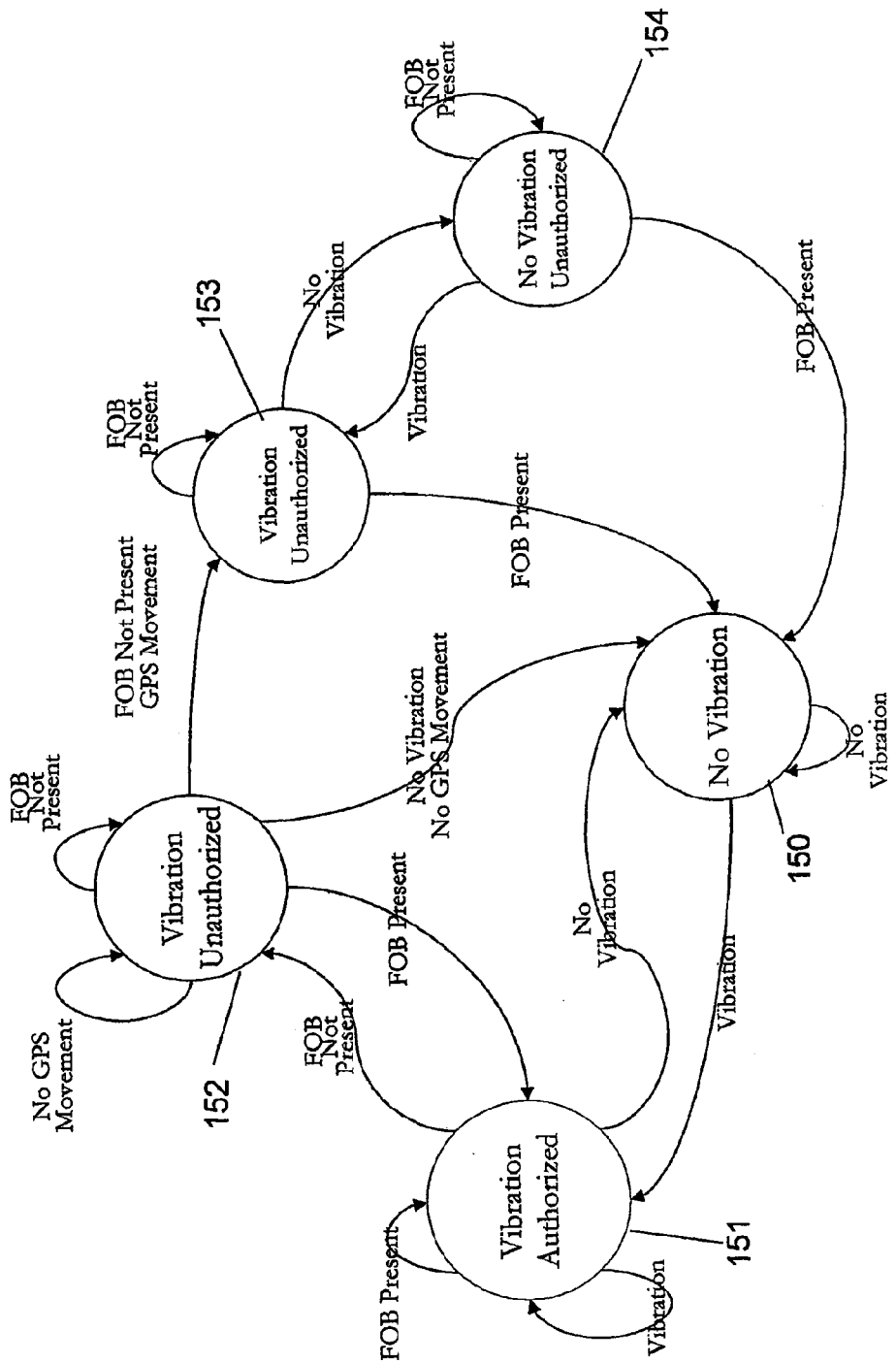
FIG. 11 is a state diagram illustrating one embodiment of the asset tracker transitioning between authorized and unauthorized states.

Certain embodiments may be further illustrated by the state diagram seen in FIG. 11. The initial state 150 exists when no vibration is detected. If vibration is detected, the controller seeks to determine whether the fob 112 is present (i.e., the receiver is enabled to determine whether the identifier signal is detected). If the fob 112 is present, the controller transitions to state 151 which presumes that the vibration is "authorized."

If the fob 112 is not detected, the controller transitions to state 152 in which vibration is considered "unauthorized." If when the controller is in state 152, the fob is detected, then the controller transitions back to state 151. If the vibration ceases and no change of location (as decided by the GNSS system) is detected, then the controller transitions back to state 150. If a change of location is detected (while the fob is not detected), then the controller transitions to state 153 and considers the asset movement to be unauthorized.

While the movement of the asset continues, the controller remains in state 153. If the asset movement stops (i.e., vibration ceases to be detected), then the controller transitions to state 154. In either state 153 or 154, the asset locator will transmit one or more location signals to the non-local network. Generally, the controller will not return to an authorized use state until the presence of the fob is once again detected. The signals may or may not include a message indicating movement is unauthorized. For example, in certain embodiments any transmission of an asset locator's position will be treated as an indication of an unauthorized use (thus not requiring a separate unauthorized use message). However, in other embodiments, locations may be transmitted even when use is authorized. In this latter case, the asset locator will transmit one or more locations and a message indicating that the use is unauthorized when the fob is not present.

Although the preceding paragraphs describe the transmission of location information while the asset locator is in an unauthorized state, there are other instances when the asset locator transmits location information while in the authorized state. For example, if the asset locator is sent a "track" command from a fob such as described in reference to FIG. 4, the asset locator will periodically (e.g., every 10-15 minutes) transmit its location at a given rate (even though the asset tracker is in an authorized used state). Similarly, upon receipt of an emergency command from the fob, the asset locator periodically transmits a location, typically at a rate greater than the Track rate (e.g., every 5 minutes). In the emergency state, the asset locator will also typically send an emergency message together with the location. When a "Check" command is executed from the fob, the asset locator sends a location (again in the authorized state) together with a check message. Typically, the Check command involves the sending of a single location message for each Check command (although multiple locations could be sent in specialized embodiments of the Check command).

In the foregoing description, reference has been made to the accompanying drawings, which form a part thereof, and in which are shown by way of illustration of specific embodiments certain examples of how the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention. Thus, many terms used herein should be interpreted in their broadest meaning. For example, "location" in the above embodiments generally refer to a GPS fix given in terms of longitude and latitude coordinates. However, "location" could be given in any terms which provide useful positional information, including distance and bearing from a known point (e.g., a cell tower), a street address or intersection, a position on a known map or reference system, or any other conventional or future developed method of identifying a geographical point. Likewise, "circuit" or "circuitry" means any group of electronic components, whether discrete components, microprocessors, or a combination of the two operating together. Where the specification or claims describe a second event being initiate or occurring "upon" the occurrence of a first event, it will be understood the second event does not need to immediately follow the first event, but only follow within a reasonable time given the relationship of the two events.

Although the communication of external devices with the asset locator or asset tracker has generally been described as wireless, the invention also includes the use of hardwired or plug-in external devices (e.g., keyboards, keypads, memory devices with software updates, or sensors) communicating with the asset locator. For example, a plug-in keypad could be used to communicate with the asset locator in addition to or as an alternative to the fob (including as an alternative the asset locator having a port for receiving a plug-in device or an electronic key which is used to convey the identifier signal). Such a keypad could provide more functionality than the fob, e.g., changing passwords, programming, etc. Naturally, such keypad or keyboard could also be wireless.

Thus, the invention can be modified to incorporate any number of variations, alternations, substitutions, or equivalent arrangements not heretofore described, but which are commensurate with the spirit and scope of the invention as described herein. PCT application PCT/US2010/53689 filed Oct. 22, 2010, entitled Simplex Personal and Asset Tracker is incorporated by reference in its entirety into this specification.

The invention claimed is:

1. An asset locator system comprising: i) a short range hand-held electrical signaling device transmitting an identifier signal, and ii) an asset locator device, the asset locator device further comprising:
   a) a wireless receiver capable of receiving an identifier signal transmitted from the hand held signaling device;
   b) a wireless transmitter capable of transmitting a message to a space based communication network;
   c) a GNSS receiver capable of determining the location of the locator device;
   d) an event sensor detecting an event indicating use or imminent use of an asset with which the asset locator is associated; and
   e) a controller configured to instruct the asset locator to:
      i) attempt to detect the identifier signal from the signaling device if the event sensor indicates a positive condition;
      ii) transmit a signal, including an asset location, to the space based network if:
         1) the identifier signal is not detected; and
         2) location fixes from the positioning system indicate a location change of the asset.

2. The asset locator system according to any of claim 1, wherein the event sensor detects at least one event of the group consisting of:
   i. asset vibration;
   ii. force applied to a driver's seat associated with the asset;
   iii. start of an engine associate with the asset;

iv. rotation of a wheel associated with the asset; or v. opening of a door associated with the asset.

3. The asset locator system according to any of claim 1, wherein the event sensor is a vibration sensor positioned within a housing of the asset locator.

4. The asset locator system according to claim 1, wherein the signaling device comprises a wireless transmitter, a controller, and a handling sensor, wherein an interrupt signal from the handling sensor transitions the signaling device controller from a sleep mode to a wake mode.

5. The asset locator system according to claim 1, wherein the signaling device is a wireless transmitter transmitting the identifier signal at a power of, alternatively: less than 100 mW, less than 50 mW, less than 10 mW, or less than 5 mW.

6. The asset locator device according to claim 1, wherein the signaling device comprises a transceiver, a controller, and a user interface, wherein the signaling device and the asset locator interface to perform the steps of:
   i) the signaling device transmitting a query to the asset locator as to whether the positioning system is detecting one or more location signals;
   ii) the asset locator transmitting a response to the signaling device indicating whether the positioning system is detecting location signals; and
   iii) the signaling device indicating on the user interface whether the positioning system is detecting location signals.

7. The asset locator device according to claim 1, wherein the signaling device has an effective range of less than about 500 meters.

8. The asset locator device according to claim 1, wherein the asset locator transmits to the signaling device status information concerning the asset locator, including at least at least one of: battery status, GPS receiver status, or satellite transmitter status.

9. A method of detecting an unauthorized location change of an asset equipped with a controller-based security device, the method comprising the steps of:
   a) sending an interrupt signal to the controller upon detection of a use event;
   b) enabling a receiver to receive a wireless transmission of an identifier signal associated with the asset;
   c) if the identifier signal is not received, determining whether the asset has changed location;
   d) if a change of location is detected, transitioning the controller into an unauthorized use state; and
   e) after the controller is in the unauthorized use state, transmitting a location and an unauthorized use message to a space based communications network.

10. The method according to claim 9, wherein if after step (b) the identifier signal is detected, then transitioning the controller into an authorized use state and continuing to detect the use event without transmitting an unauthorized use message to the space based network.

11. The method according to claim 9, further comprising the step of continuing to transmit a location to the space based network while the controller is in an unauthorized state.

12. The method according to claim 9, wherein if the identifier signal is detected in step (b), then no determination is made of location change and the asset location is not transmitted.

13. The method according to claim 9, wherein if: (i) the use event ceases after initial vibration was detected, and (ii) there has been no location change since initial use event was detected, then the location is not transmitted to the space based network.

14. The method according to claim 12, further comprising the step of the receiver being disabled until the next use event is detected.

15. The method according to claim 9, wherein if: (i) the identifier signal has not been detected, and (ii) a location change is detected, then continuing to determine the asset's location and transmit the location while the identifier signal is not received.

16. The method according to claim 9, further comprising the step of transmitting the identifier signal from a short range transmitter housed in a hand-held signaling device.

17. The method according to claim 9, wherein the step of determining a location change includes: (i) taking a new location fix after determining the identifier signal has not been received, and (ii) comparing the new location fix to a prior location fix taken when said identifier signal was detected.

18. The method of claim 9, wherein a rate at which the receiver is periodically enabled to detect the identifier signal is a first rate prior to detection of the identifier signal and a second, lesser rate after detection of the identifier signal.

19. The method according to any of claim 9, wherein the location determination is made using an error correction method which includes employing multiple location fixes to estimate a location.

20. The method according to claim 16, wherein upon receipt of a track command from the hand-held signaling device, periodically transmitting at a first rate a location of the security device while in an authorized used state.

* * * * *